(12) United States Patent
Overdevest et al.

(10) Patent No.: US 12,625,227 B2
(45) Date of Patent: May 12, 2026

(54) METHOD OF PROCESSING RADAR DATA

(71) Applicant: NXP B.V., Eindhoven (NL)

(72) Inventors: Jeroen Overdevest, Eindhoven (NL); Marco Jan Gerrit Bekooij, Empel (NL); Arie Geert Cornelis Koppelaar, Giessen (NL)

(73) Assignee: NXP B.V., Eindhoven (NL)

( * ) Notice: Subject to any disclaimer, the term of this patent is extended or adjusted under 35 U.S.C. 154(b) by 325 days.

(21) Appl. No.: 18/483,792

(22) Filed: Oct. 10, 2023

(65) Prior Publication Data

US 2024/0133999 A1 Apr. 25, 2024

(30) Foreign Application Priority Data

Oct. 17, 2022 (EP) ..................................... 22201937

(51) Int. Cl.
*G01S 7/02* (2006.01)
*G01S 7/35* (2006.01)
*G06F 17/11* (2006.01)

(52) U.S. Cl.
CPC .............. *G01S 7/023* (2013.01); *G01S 7/352* (2013.01); *G06F 17/11* (2013.01)

(58) Field of Classification Search
CPC .......... G06F 17/11; G01S 7/023; G01S 7/356; G01S 7/354; G01S 13/723; G01S 13/89; G01S 13/5244
USPC .................................. 342/159, 192, 195, 196
See application file for complete search history.

(56) References Cited

U.S. PATENT DOCUMENTS

| | | | | |
|---|---|---|---|---|
| 5,248,976 A | * | 9/1993 | Niho ................... | G01S 13/9019 342/25 A |
| 5,734,347 A | * | 3/1998 | McEligot ................ | G01S 13/89 342/146 |
| 7,064,702 B1 | * | 6/2006 | Abatzoglou ........ | G01S 13/9019 342/25 R |

(Continued)

FOREIGN PATENT DOCUMENTS

WO 2022156905 A1 7/2022

OTHER PUBLICATIONS

Bechter, J., "Automotive Radar Interference Mitigation using a Sparse Sampling Approach", Proceedings of the 14th European Radar Conference, Oct. 11-13, 2017.

(Continued)

*Primary Examiner* — Michael W Justice

(57) ABSTRACT

A method of processing radar data comprising: receiving a mask that identifies a set of samples in received radar signalling that are detected as including interference, and comprises a matrix of data having a fast-time dimension and a slow-time dimension; receiving radar data comprising a matrix of samples of received radar signalling having a fast-time dimension and a slow-time dimension wherein the set of samples identified by the mask have been set to a predetermined value to remove said samples including interference; determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain.

15 Claims, 9 Drawing Sheets

(56) References Cited

U.S. PATENT DOCUMENTS

| | | | | |
|---|---|---|---|---|
| 7,589,666 | B2 * | 9/2009 | Passarelli, Jr | G01S 13/5244 |
| | | | | 342/194 |
| 8,493,262 | B2 * | 7/2013 | Boufounos | G01S 13/904 |
| | | | | 342/25 R |
| 10,228,449 | B2 * | 3/2019 | Nguyen | H04L 25/03305 |
| 10,330,773 | B2 * | 6/2019 | Rao | G01S 7/003 |
| 10,473,429 | B1 * | 11/2019 | Louchard | G06V 10/48 |
| 10,495,750 | B1 * | 12/2019 | Musgrove | G01S 13/904 |
| 11,049,267 | B2 * | 6/2021 | Selviah | G06T 7/33 |
| 11,460,541 | B2 * | 10/2022 | Oren | G01S 7/354 |
| 11,476,795 | B2 * | 10/2022 | West | H02S 10/20 |
| 11,579,242 | B2 * | 2/2023 | Rao | G01S 7/354 |
| 2008/0001808 | A1 * | 1/2008 | Passarelli, Jr. | G01S 13/5244 |
| | | | | 342/26 R |
| 2012/0206292 | A1 * | 8/2012 | Boufounos | G01S 13/9011 |
| | | | | 342/25 A |
| 2016/0341814 | A1 * | 11/2016 | Nguyen | H04L 25/03305 |
| 2017/0363711 | A1 * | 12/2017 | Rao | G01S 7/354 |
| 2019/0158011 | A1 * | 5/2019 | West | G06N 20/20 |
| 2019/0331765 | A1 * | 10/2019 | Rao | G01S 7/003 |
| 2020/0043186 | A1 * | 2/2020 | Selviah | G06T 7/33 |
| 2020/0309938 | A1 * | 10/2020 | Oren | G01S 13/003 |
| 2021/0149042 | A1 * | 5/2021 | Wennersten | G01S 13/34 |
| 2023/0102833 | A1 * | 3/2023 | Overdevest | G01S 13/343 |
| | | | | 342/109 |
| 2023/0325982 | A1 * | 10/2023 | Kapoor | G06N 3/08 |
| | | | | 382/104 |
| 2024/0069152 | A1 * | 2/2024 | Poddar | G01S 13/34 |

OTHER PUBLICATIONS

Beck, A., "A Fast Iterative Shrinkage-Thresholding Algorithm with Application to Wavelet-Based Image Deblurring", 2009 IEEE International Conference on Acoustics, Speech and Signal Processing, Apr. 19-24, 2009.

Brooker, G., "Mutual Interference of Millimeter-wave Radar Systems", IEEE Transactions on Electromagnetic Compatibility, vol. 49, No. 1, pp. 170-181, Feb. 20, 2007.

Gregor, K., "Learning fast approximations of sparse coding," in Proceedings of the 27th International Conference on International Conference on Machine Learning, ICML'10, p. 399-406, Omnipress, Jun. 21, 2010.

Liu, J., "ALISTA: Analytic weights are as good as learned weights in LISTA," in International Conference on Learning Representations, Jan. 1, 2019.

Mun, J., "Automotive Radar Signal Interference Mitigation Using RNN with Self Attention", 2020 IEEE International Conference of Acoustics, Speech and Signal Processing (ICASSP), May 4-8, 2020.

Overdevest, J., "FMCW Radar-To-Radar Interference Mitigation Using Deep Unfolding", 2023 IEEE International Conference of Acoustics, Speech and Signal Processing (ICASSP), Jun. 4-10, 2023.

Rameez, M., "Autoregressive Model-Based Signal Reconstruction for Automotive Radar Interference Mitigation", IEEE Sensors Journal, vol. 21, No. 5, Mar. 1, 2021.

* cited by examiner

METHOD OF PROCESSING RADAR DATA

CROSS-REFERENCE TO RELATED APPLICATIONS

This application claims the priority under 35 U.S.C. § 119 of European Patent application no. 22201937.4, filed on 17 Oct. 2022, the contents of which are incorporated by reference herein.

FIELD

The present disclosure relates to an apparatus and a method for processing radar data, and in particular for mitigating the effects of interference on the radar signalling.

BACKGROUND

There are processes that may be used to mitigate against interference in radar signalling.

SUMMARY

According to a first aspect of the present disclosure there is provided a method of processing radar data, the method comprising:

receiving a mask that identifies a set of samples in received radar signalling that are detected as including interference, wherein the mask comprises a matrix of data having a fast-time dimension and a slow-time dimension;

receiving radar data comprising a matrix of samples of received radar signalling having a fast-time dimension and a slow-time dimension wherein the set of samples identified by the mask have been set to a predetermined value to remove said samples including interference;

determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain wherein an output of each iteration of the iterative method is converted to the time domain and wherein reconstruction of the radar data comprises said output after at least one iteration.

In one or more embodiments, the iterative method includes application of a thresholding function in the range-Doppler domain.

In one or more embodiments, a first iteration of said iterative method is configured to apply a soft thresholding function to a function of the range-Doppler processed radar data.

In one or more embodiments, the determination of the reconstruction of the radar data comprises a plurality of iterations of the iterative method; and wherein a subsequent iteration of said iterative method, after the first iteration, is configured to apply the soft thresholding function to a function of the output of a previous iteration, the mask and the radar data.

In one or more embodiments, a first iteration of said application of the iterative method to solve the optimization problem comprises the steps of:

determining a two-dimensional Fourier Transform of the radar data multiplied by a predetermined scalar, $\mu$, wherein the two-dimensional Fourier Transform provides for conversion to the range-Doppler domain;

applying a soft thresholding function to the two-dimensional Fourier Transform of the radar data multiplied by the predetermined scalar, to determine a thresholded dataset;

determining an output of the first iteration by determining an Inverse two-dimensional Fourier Transform of the thresholded dataset to provide for the conversion to the time domain.

In one or more embodiments, each subsequent iteration of said iterative method comprises determining an output of the subsequent iteration by the steps of:

determining a first function comprising the difference between an element-wise multiplication of the mask and an output of an iteration comprising an immediately prior iteration, and the radar data;

determining a second function comprising a scalar multiplied by the first function, wherein the scalar is termed a step-size scalar;

determining a third function comprising the output of the iteration that comprises the immediately prior iteration minus the second function; and determining a fourth function comprising the application of a complex soft thresholding function to a two-dimensional Fourier Transform of the third function; and determining an inverse two-dimensional Fourier Transform of said fourth function.

In one or more embodiments, each subsequent iteration of said iterative method comprises determining an output of the subsequent iteration by the steps of:

determining a first function comprising the element-wise multiplication of a function of the mask and an output of an iteration comprising an immediately prior iteration, wherein the function of the mask comprises $(1-\mu m)$ wherein $\mu$ comprises a predetermined scalar termed a step-size scalar;

determining a second function comprising the first function added to the radar data scaled by said step-size scalar;

determining a third function comprising the application of a complex soft thresholding function to a two-dimensional Fourier Transform of the second function; and determining an inverse two-dimensional Fourier Transform of said third function.

In one or more embodiments, said complex soft thresholding function comprises $T_\lambda(x)=e^{j\angle x}(|x|-\lambda)_+$ wherein x represents the data to which the complex soft thresholding function is applied and $\lambda$ represents the threshold of the thresholding function, wherein values of x that have $|x|<\lambda$ will be set to zero and the other values will be scaled to $|x|-\lambda$.

In one or more embodiments, the step-size scalar comprises one.

In one or more embodiments, said iterative method is performed based on the step-size scalar $\mu_k$ which defines a step-size for each iteration of the iterative method and a shrinkage-threshold $\lambda_k$ which defines a threshold of the complex soft thresholding function applied in each iteration and wherein said method includes using an updated step-size scalar $\mu_k$ and updated shrinkage-threshold $\lambda_k$ in the subsequent iteration.

In one or more embodiments, the updated step-size scalar $\mu_k$ and the updated shrinkage-threshold $\lambda_k$ for use in the subsequent iteration or iterations is determined using a deep learning process involving back-propagation.

In one or more embodiments, an output of an iteration of said iterative method is defined by $x_k$ wherein:

$$x_k = F^{-1}\{T_{\lambda_k}(F\{s_k - \mu_k(m \odot s_k - y)\})\}$$

wherein $F\{\ \}$ and $F^{-1}\{\ \}$ represent a two-dimensional Fourier transform and inverse two-dimensional Fourier transform respectively, $T_{\lambda_k}$ represents a complex soft thresholding function with threshold $\lambda_k$, m represents said mask; y represents said radar data and $\mu_k$ represents an step-size scalar and $\odot$ represents an element-wise multiplication; and wherein:

$$t_{k+1} = \frac{1 + \sqrt{1 + 4t_k^2}}{2} \text{ and}$$

$$s_{k+1} = x_k + \frac{t_k - 1}{t_{k+1}}(x_k - x_{k-1})$$

In one or more embodiments, only said set of samples are replaced with estimated samples such that said reconstruction of the radar data is designated $\hat{x}$ wherein $$\hat{x} = m \odot x + (1-m) \odot x_x$$

wherein m designates the mask, x designated the radar data and $x_k$ designates the output of at least one iteration of said iterative method.

In one or more examples, the method comprises processing the radar signalling to determine the mask.

According to a further aspect of the present disclosure, there is provided a computer program configured to perform the method of the first aspect. The computer program may be provided on a non-transitory computer readable medium.

According to a further aspect of the present disclosure, there is provided a processor configured to:

receive a mask that identifies a set of samples in received radar signalling that are detected as including interference, wherein the mask comprises a matrix of data having a fast-time dimension and a slow-time dimension;

receive radar data comprising a matrix of samples of received radar signalling having a fast-time dimension and a slow-time dimension wherein the set of samples identified by the mask have been set to a predetermined value to remove said samples including interference;

determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain wherein an output of each iteration of the iterative method is converted to the time domain and wherein reconstruction of the radar data comprises said output based on at least one iteration.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Frequency-Modulated Continuous Wave (FMCW) radar-to-radar interference is likely to become an increasing challenge as more and more cars are being employed with FMCW radar sensors to sense the environment around the car.

As the number of radar sensors equipped on a single car increases, the likelihood that radars will share similar time-frequency resources while spatially overlapping will rise significantly.

Without any coordination or standardization, the radar should adapt itself to mitigate and avoid interference from other radars. Digital signal processing techniques are highly effective to suppress the interference energy, even before range-Doppler processing. The interference can be detected in the time-domain (e.g. in samples from an ADC (analogue to digital converter)) and mitigated immediately after. A very cost-effective approach to cancel the interference is to set the interference impacted beat-signal samples (fast-time) to zero. However, the zeroing creates artefacts in the velocity gates of the range-Doppler map in case of very strong targets. The stronger the targets, the stronger these artefacts will be. The artefacts can be incorrectly detected as targets by a Constant False-Alarm Rate (CFAR) detector if they exceed the CFAR threshold. Therefore, these detections can be called ghost detections.

Examples disclosed herein can provide a technique that is independently run such as with the use of conventional range-Doppler processing, with the benefit of restoring the processing gain caused by zeroing and reducing the artefacts caused by zeroing, respectively improving the amount of false negatives and reducing the amount of false positives.

Frequency modulated continuous wave (FMCW) is a waveform that is often used for automotive radar systems due to its accuracy and robustness. In particular, an implementation in which a sequence of short duration frequency chirps is transmitted has favourable properties with respect to the detection of objects moving with a non-zero relative radial velocity. A system using this waveform is described in: 'Linear FMCW radar Techniques', A. G. Stove, IEEE Proceedings-F, Vol. 139, No. 5, October 1992.

Figure 1A:
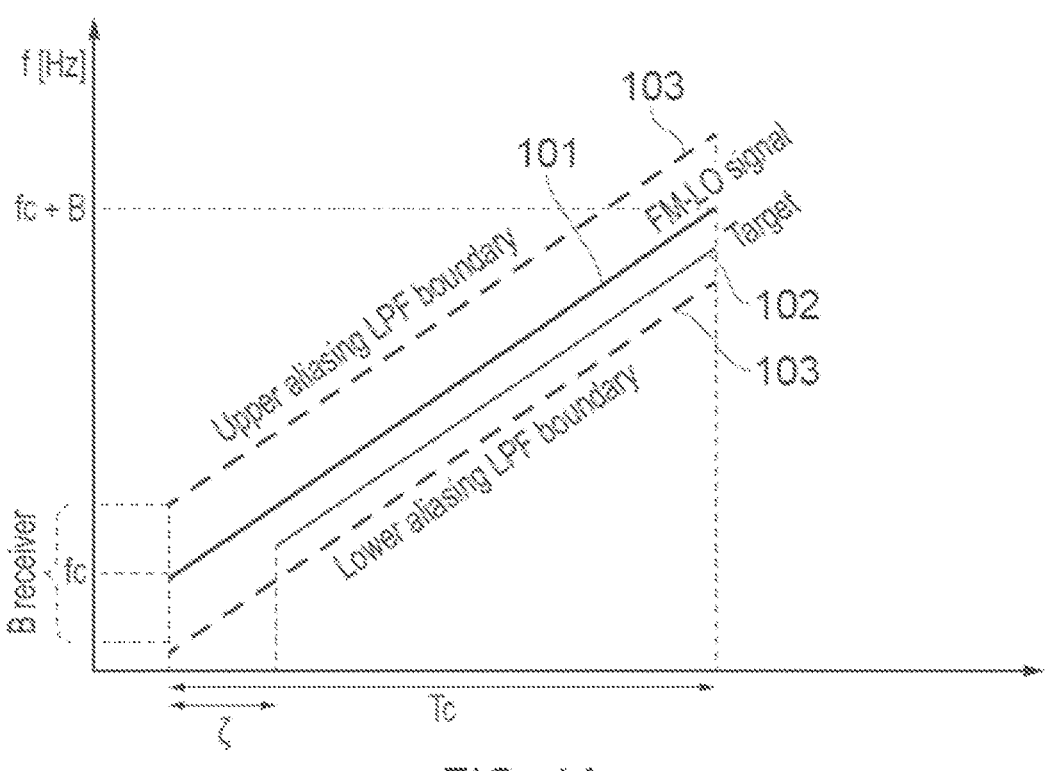
FIG. 1A shows a plot of radar signalling, with time on the horizontal axis and frequency on the vertical axis.

FIG. 1A shows a plot of radar signalling, with time on the horizontal axis and frequency on the vertical axis. The plot shows a transmitted FMCW chirp signal 101 and the received, reflected, signal 102. The dotted lines 103 represent the bandwidth of an anti-aliasing filter (AAF) where the IF (intermediate frequency) signal is confined before acquisition. The instantaneous frequency difference between the transmitted signal 101 and the received signal 102 is constant for the duration of a frequency ramp in this example.

The received signal 102 that is reflected from an object is delayed in time with respect to the transmitted signal 101. The time delay, which is visible in FIG. 1A, is due to the propagation time between the radar system and the reflecting object in the forward and backward direction. In an FMCW system a sine wave with an increasing or decreasing frequency is transmitted. In the down conversion operation, the transmitted signal is down-mixed with the time-delayed transmitted signal in the analog domain. In case the relative velocity between the radar system and the reflecting object is zero, the time delayed signal is an attenuated and phase rotated version of the transmitted signal.

The result of the down conversion operation is a sine wave oscillating at the so-called beat frequency. The frequency depends on the distance to the reflecting object D, the difference between the start and the stop frequency of the ramp ΔF, and the duration of the ramp $T_{ramp}$:

$$f_{beat} = \frac{\Delta F}{T_{ramp}} \frac{2D}{c_0}$$

where $c_0$ is equal to the speed of light.

In case the relative velocity is non-zero, the corresponding Doppler frequency is added to the beat frequency. The Doppler component will change the phase of the received frequency ramp.

A well-known technique, the two-dimensional Fast Fourier Transformation (FFT), can be used to calculate the distance and the relative radial velocity, respectively. In such FMCW radar systems, the relationship between the distance and the beat frequency is linear. The beat frequency increases with increasing distance to the reflecting object. In practice, multiple reflections can be present in the field of view of the radar system. In this case the output of the down conversion operation is a summation of sine waves oscillating at the beat frequencies corresponding to the distances to the reflecting objects.

Figure 1B:
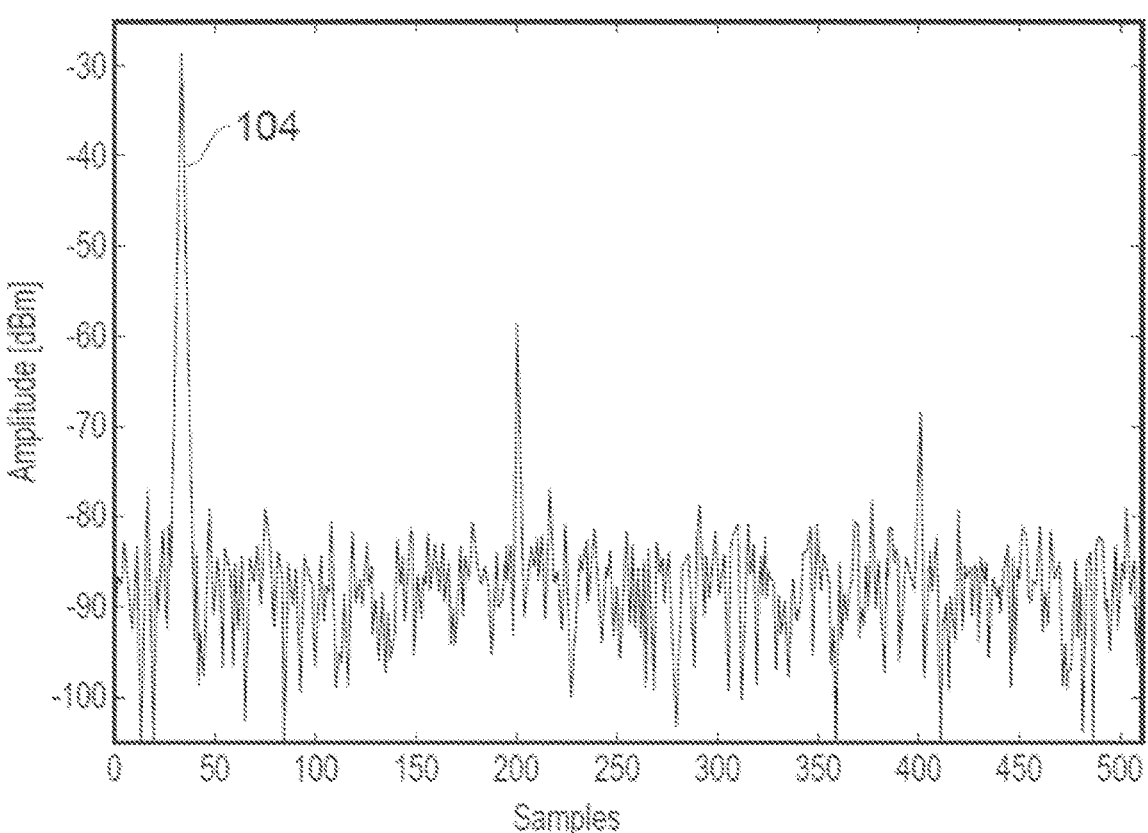
FIG. 1B shows an example of a radar range profile where three targets are present at difference distances.

FIG. 1B shows an example of a radar range profile 104 (after 2D-FFT processing) where three targets are present at difference distances. Each target is represented by a peak in the amplitude at a different sample value. In FIG. 1B the targets are at about samples 40, 200 and 400. The noise floor is mainly determined by the thermal noise (−174 dBm/Hz). As can be seen from FIG. 1B, using an anti-aliasing filer (AAF) with a cut-off frequency that matches the ADC sample rate determines the maximum beat frequency and consequently the maximum detectable range. Furthermore, the AAF also reduces the amount of unwanted noise and interference that is captured at the radio frequency (RF) carrier.

Figure 2A:
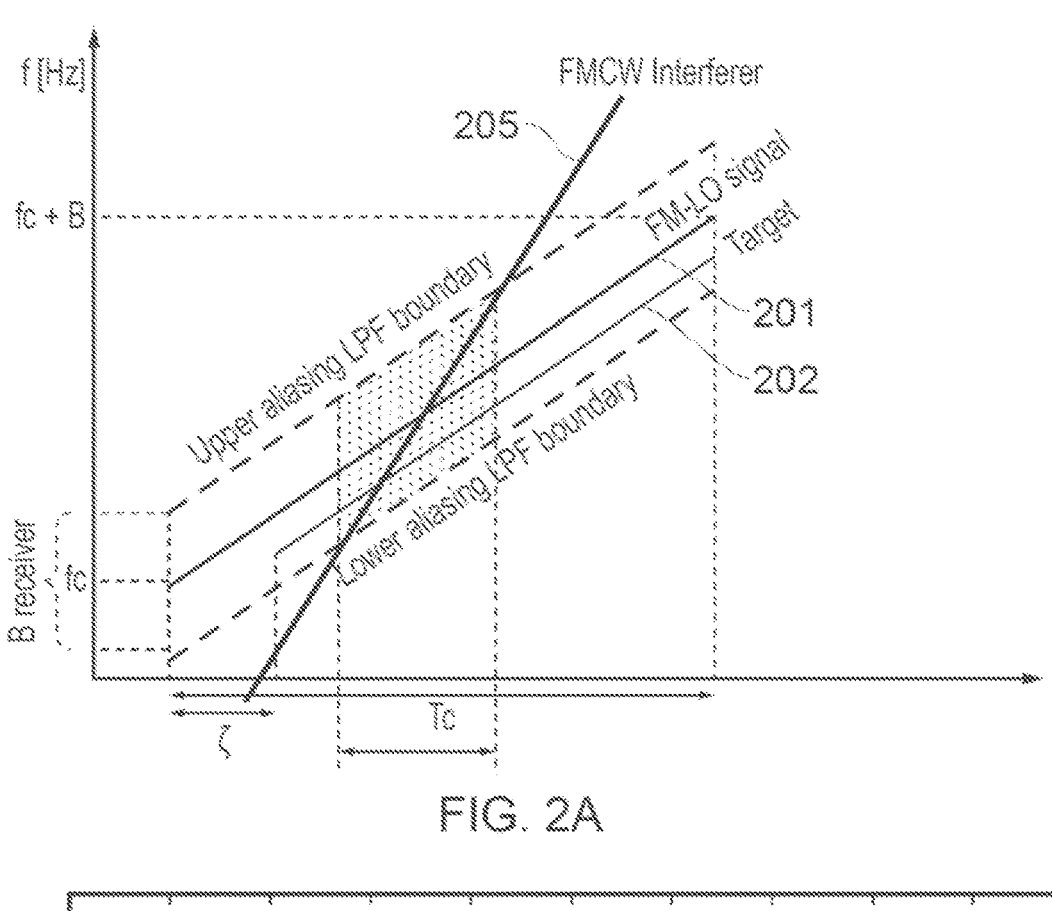
FIG. 2A shows a plot that is similar to that of FIG. 1A, but in FIG. 2A there is interference.

FIG. 2A shows a plot that is similar to that of FIG. 1A, but in FIG. 2A there is interference. FIG. 2a shows a transmitted FMCW chirp signal 201, a received, reflected, signal 202 and the FMCW signal from another radar 205 (which is interference for the radar system that transmits the FMCW chirp signal labelled as 201). The most likely type of interference is uncorrelated interference, which can occur when the victim and the interferer radar have different ramp slopes and different start/stop times, as shown in FIG. 2A.

Figure 2B:
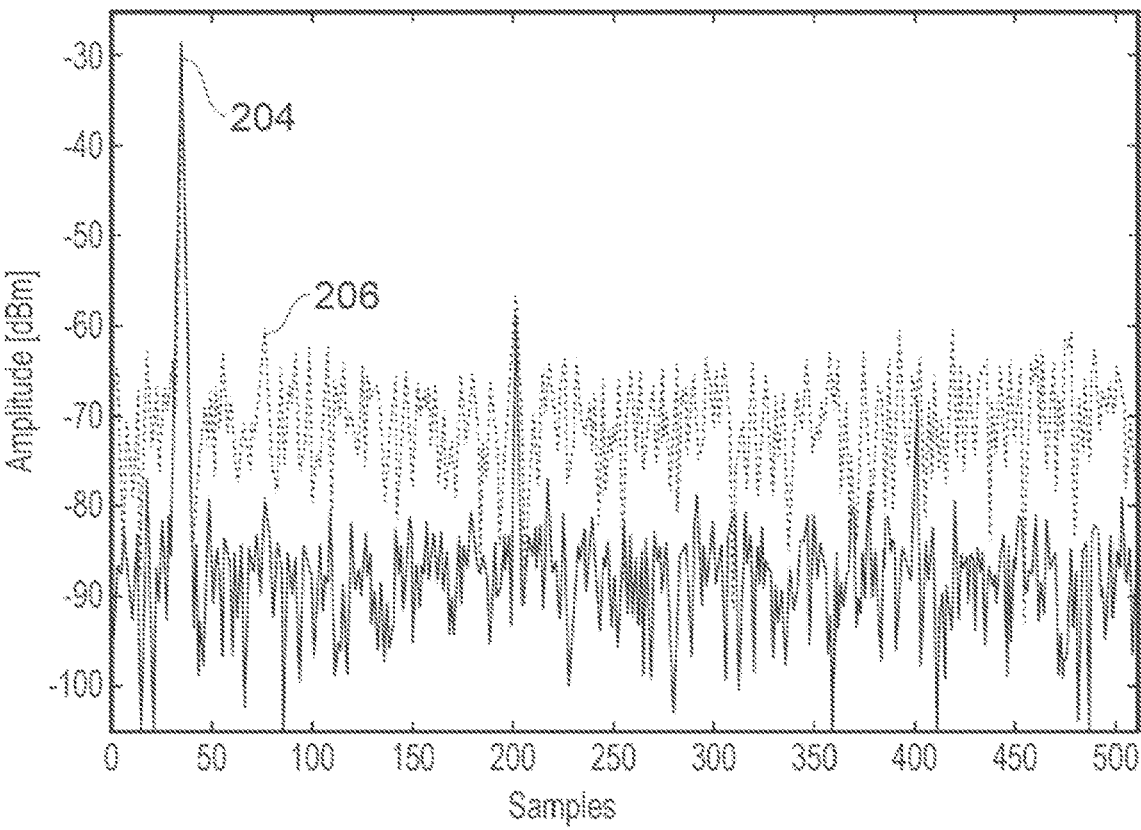
FIG. 2B shows the radar range profile for the signals of FIG. 2A, where an incoherent FMCW interferer is present.

FIG. 2B shows the radar range profile 206 for the signals of FIG. 2A, where an incoherent FMCW interferer is present. FIG. 2B also shows the radar range profile 204 for signals without interference from the FMCW signal from the other radar for comparison. FIG. 2B shows that the noise floor is drastically increased by the amount of the interference energy within the AAF bandwidth and as a result the weakest target (peak) is drowned in the noise.

Figure 3A:
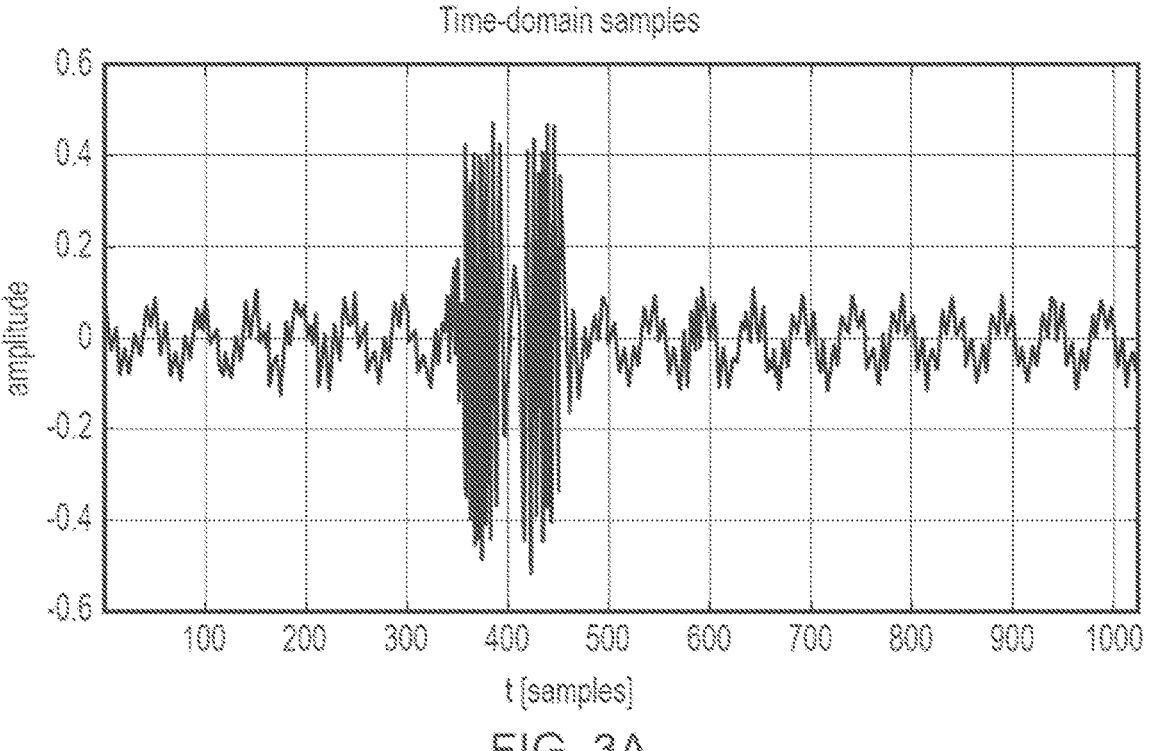
FIG. 3A illustrates a plot of an interfered beat signal of a single chirp in time-domain.

FIG. 3A illustrates a plot of an interfered beat signal of a single chirp in time-domain, with time (in samples) on the horizontal axis and amplitude on the vertical axis. It can be clearly observed that the interference presence is time limited, which indicates the effect of the AAF. In FIG. 3A, the interference due to another FMCW occurs in (about) samples 380-480. The other detected interference (in the following sample ranges: 210-220, 230-240 and 580-600) is weaker. Outside of the interference there is a narrowband signal with a combination of sine waves (each with a relatively constant frequency), one for each target.

There are known systems that can identify time-domain samples in radar signalling that are likely to have interference, for example as described in EP3620810 A1. As will be described below, the interference raises the noise floor after the subsequent Doppler processing.

Figure 3B:
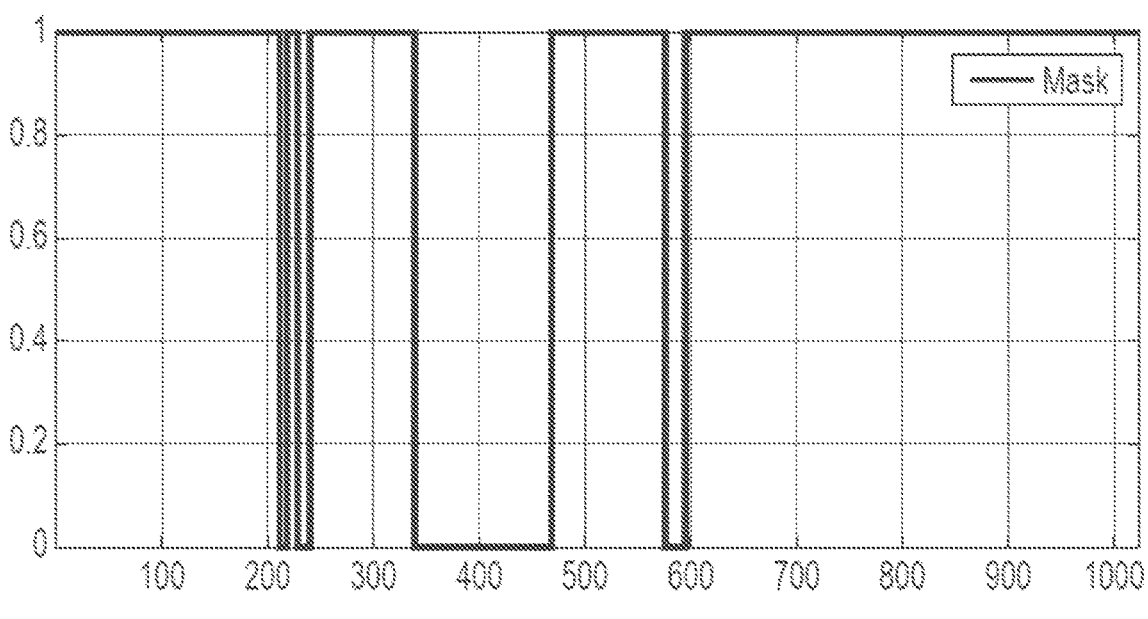
FIG. 3B shows an example of an interference mask for the interfered beat signal of FIG. 3A.

FIG. 3B shows an example of an interference mask (which will subsequently be referred to simply as a mask) for the interfered beat signal of FIG. 3A. The mask of FIG. 3B show the results of an interference detection technique. For each chirp, the mask specifies which samples are likely to be interfered and which are non-interfered. In this example the mask is a binary mask, which has a value of 0 to specify samples that are interfered and a value of 1 to specify samples that are non-interfered.

Figure 3C:
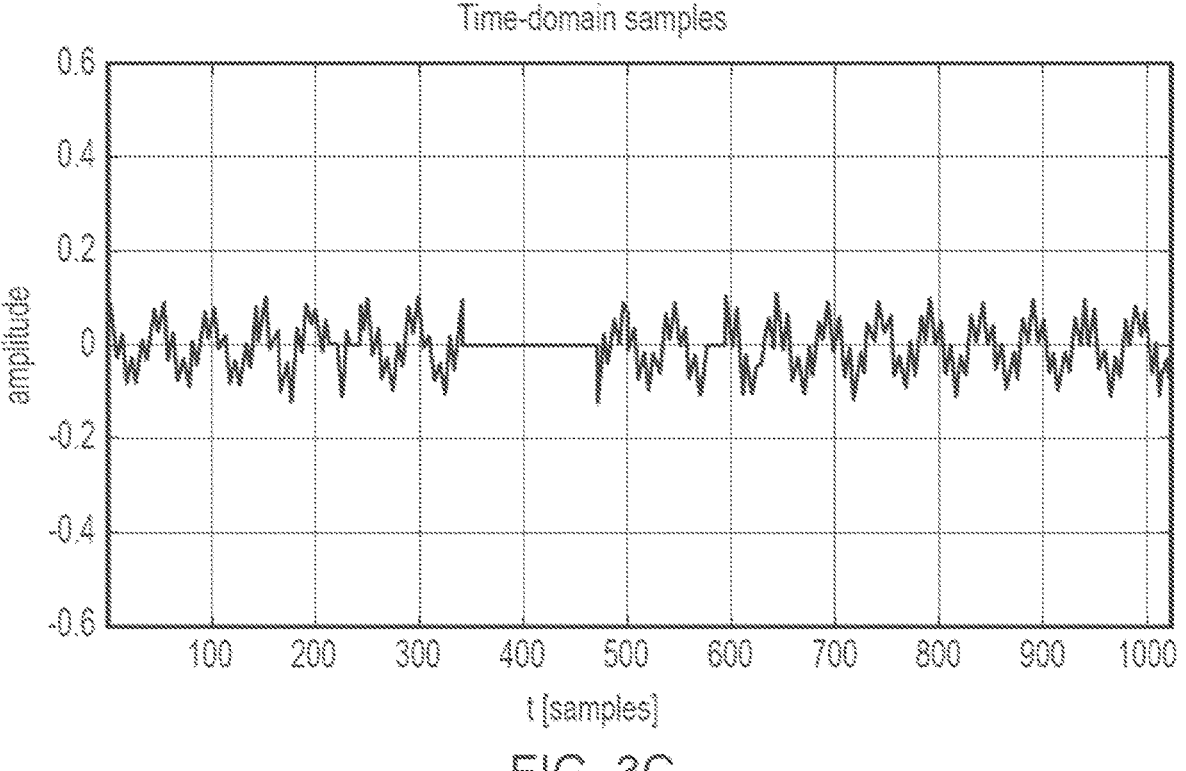
FIG. 3C shows the result of applying the mask of FIG. 3B to the radar signalling of FIG. 3A.

FIG. 3C shows the result of applying the mask of FIG. 3B to the radar signalling of FIG. 3A. The signalling of FIG. 3C can be referred to as interference-reduced-radar-signalling. Simply zeroing the detected interfered samples (also referred to as nulling), as shown in FIG. 3C, can be a very cost-effective way of mitigating the interference energy. If all interfered samples (even when the interference power is comparable to the maximum beat signal power) have been correctly identified, the interference energy can be completely removed.

However, this comes at a cost because the gaps in the signalling can result in amplitude reduction and/or phase distortion after subsequent frequency analysis (such as the application of a range FFT). This, in turn, can result in distance and velocity artefacts.

Figure 4:
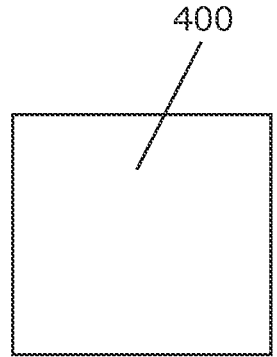
FIG. 4 shows an example apparatus, which may comprise a processor.

Accordingly, in one or more examples we define a method and an apparatus comprising a processor 400, shown in FIG. 4, which may comprise a processor in combination with associated memory. The apparatus may be configured to receive radar data comprising radar signalling or a processed form thereof. The radar data may represent received radar signalling comprising radar signalling that has reflected from one or more objects and may include interference. The radar signalling and therefore the received radar signalling may comprise a plurality of chirps or pulses. The radar data may comprise a matrix of samples having a fast-time dimension and a slow-time dimension. As will be appreciated by those skilled in the art, the fast-time dimension may represent samples of the received radar signalling received over each chirp or pulse and the slow-time dimension may represent samples of the radar signalling received over successive chirps or pulses. The radar data may have been processed, using known methods, to identify samples affected by interference, such as those samples affected by interference above a threshold level. The radar data may have been processed to remove those samples affected by interference by setting them to a predetermined value, such as zero. The radar data may be generated by application of a mask, that identifies the samples to change to the predetermined value, to the received radar signalling. The method and apparatus may be configured to process the radar data to at least restore samples changed by application of said mask.

Removal of Interference and Compensation

One can represent the mitigation strategy to generate the interference-reduced-radar-signalling as:

$$\bar{x} = m \odot x$$

$X \in \mathbb{R}^{M \times N}$ represents the radar data and comprises a plurality of samples representing a beat signal derived from the down converted received radar signalling. The radar data x comprises a matrix of N fast-time samples and M slow-time samples. m represents a binary detection mask such that $m \in \{0,1\}^{M \times N}$ for N fast-time samples and M slow-time samples. The mask is determined by a known process and identifies which samples in the radar data are to be zeroed. $\bar{x} \in \mathbb{R}^{M \times N}$ is the interference mitigated radar data comprising the beat signal processed by zeroing samples identified as affected by interference. $\odot$ denotes the element-wise multiplication. Zeroing causes the coherent processing gain to be affected by the substituted zeros according to the mask m, as well as the phase being distorted.

It has been realised by the inventors that deep unfolding could be applied effectively to any sparse coding problem provided that the radar data comprising the beat signal, x, is sparse.

As will be known to those skilled in the art, sparse coding problems can be written in the form of equation (1);

$$y_{mv} = A x_{sv} + n \tag{1}$$

where $y_{mv}$ is known as the measurement vector, $x_{sv}$, is the sparse vector, A is the measurement matrix or "dictionary" and n is the noise vector.

In equation (1) $x_{sv}$, is supposed to be a vector of dimension N and having K non-zero components. With K<<N one can call x a sparse vector. The problem one wants to solve is to estimate the vector $x_{sv}$, while one has no direct observation of it. Instead one has the vector $y_{mv}$ as an observable, which is a linear transformation of $x_{sv}$ using the transformation matrix A and corrupted by noise represented with n. By means of A and the noise n, $y_{mv}$ is usually not sparse. The application of such theory to the processing of radar data has presented a challenge.

If x, representing the radar data and comprising the beat signal (rather than the sparse vector in equation (1)), is sufficiently sparse after range-Doppler processing, it has been determined that we can formulate a sparse coding problem as an unconstrained optimization problem by following the LASSO (least absolute shrinkage and selection operator) method. The application of the LASSO method to mitigate the effects of the zeroing has been found to be advantageous. How the LASSO method is applied will now be described.

The LASSO method penalizes the $\ell$ 1-norm via a shrinkage scalar $\lambda$. The formulation of the solution to the problem of equation (1) may be presented as follows:

$$\hat{x} = \operatorname{argmin} \frac{1}{2} \|y - A x_{sv}\|_2^2 + \lambda \|x_{sv}\|_1 \tag{2}$$

$\hat{x}$ is an estimate of the sparse vector $x_{sv}$.

Equation (2) can be solved using the iterative shrinkage and thresholding algorithm (ISTA). The k-th solution using ISTA $x_k$ is defined as:

$$x_{k+1} = T_\lambda(x_k = \mu A^H(A x_k - y))) \tag{3}$$

Here, $\mu$ is the update step size (as known to those skilled in the art of ISTA) and $T_\lambda(.)$ is the real-valued soft thresholding function $T_\lambda(x) = \operatorname{sign}(x) (|x| - \lambda)_+$ where $\lambda$ is the threshold associated with the thresholding function wherein values of x that have $|x| < \lambda$ will be set to zero and the other values will be scaled to $|x| - \lambda$. It will be appreciated that in other examples a non-soft, or normal, thresholding functions may be used.

Figure 5:
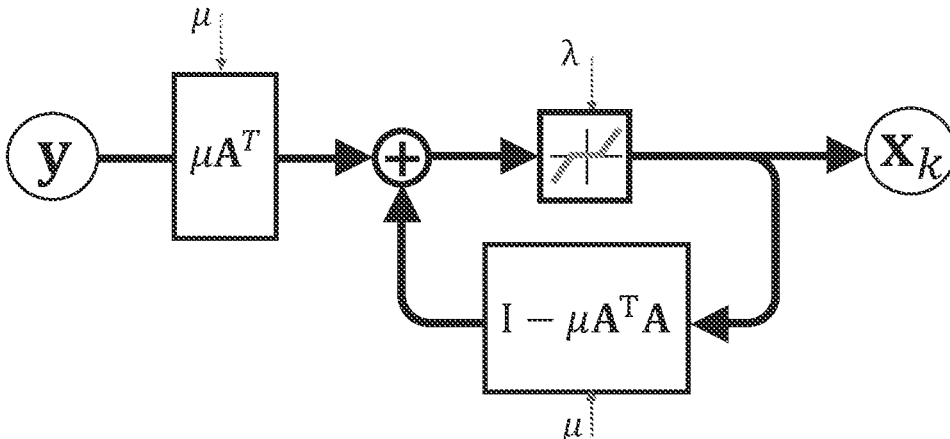
FIG. 5 shows an example block diagram of the ISTA algorithm.

A block diagram of the ISTA algorithm in a general form not directly applicable to interference mitigated radar signalling has been visualized in FIG. 5.

Thus, to explain further, when applying the above-mentioned technique to radar signalling, it is found that the radar signalling, that is the analog-to-digital converted (ADC) samples x, received from multiple chirps or pulses (hence x is two dimensional) may not be sufficiently sparse. It has been realised that the sparsity requirement for effective application of the principles of LASSO may be realised by processing radar signalling that has been range-Doppler processed. Thus, in the range-Doppler domain:

$$F\{y\} = F\{m \odot x\} \tag{4}$$

with y being the two-dimensional interference-reduced-radar-signalling in the time domain, termed "radar data". $F\{.\}$ and $F^{-1}\{.\}$ denote a 2D Fourier and inverse Fourier transform, respectively. Thus, $F\{y\}$ represents the radar data subjected to range-Doppler processing and the above-mentioned zeroing.

In the present embodiments, an iterative method is applied to solve an optimization problem that provides for an iterative determination of a reconstruction of the radar data which may further be based on a step size parameter and a thresholding function. The present embodiments provide for application of the iterative method at least in part in the range-Doppler domain and subsequent application of an inverse FFT which has been found to be effective to process radar data to generate the reconstruction of the radar data. The formulation of the objective problem and the form the iterative method takes can vary between embodiments, which will be described below. In particular it has been found that at last one way to formulate the optimization problem in a form for solving by an iterative method is as follows:

$$x_{x+1} = F^{-1}\{T_\lambda(F\{x_k\} - \mu(F\{m \odot x_k\} - F\{y\}))\} \tag{5}$$

Wherein $x_{k+1}$ comprises the next iteration; $x_k$ comprises the previous iteration; $T_\lambda$ comprises a soft-thresholding function; and $F\{y\}$ comprises the range-Doppler processed radar data, $F\{m \odot x_k\}$ comprises the 2D Fourier transform of an element-wise multiplication of the mask and the output of the previous iteration and $\mu$ is a predetermined scalar.

In a further embodiment, it has been found that one can take into account the linearity property of the Fourier transform ($F\{ac\}+F\{bd\}=F\{ac+bd\}$), resulting in a reduction of the number of total Fourier Transforms, such that:

$$x_{k+1}=F^{-1}\{T_\lambda(F\{x_k-\mu(m \odot x_k-y)\})\} \qquad (6)$$

Compared to equation (3), we have applied a complex soft thresholding function $T_\lambda(x)=e^{j\angle^x}(|x|-\lambda)_+$. $\lambda$ is a predetermined threshold or "shrinkage parameter" used in the soft thresholding function and is a scalar $\lambda>0$. It will be appreciated that values of x that have $|x|<\lambda$ will be set to zero and the other values will be scaled to $|x|<-\lambda$. The $\exp(j \arg(x))$ factor will take care that phase information is not destroyed. The initial "guess" where $x_k=x_0$ is usually selected as the zero matrix: $x_0=0_{M,N}$ of size M×N.

Thus, it will be appreciated that the optimization problem and application of the iterative method thereto can be formulated in different ways (e.g. at least as represented by equations 5 and 6). However, it is common that by performing such a method based on the two-dimensional mask and two-dimensional radar data in the range-Doppler domain, embodiments of the method have been found to be highly effective.

Figure 10:
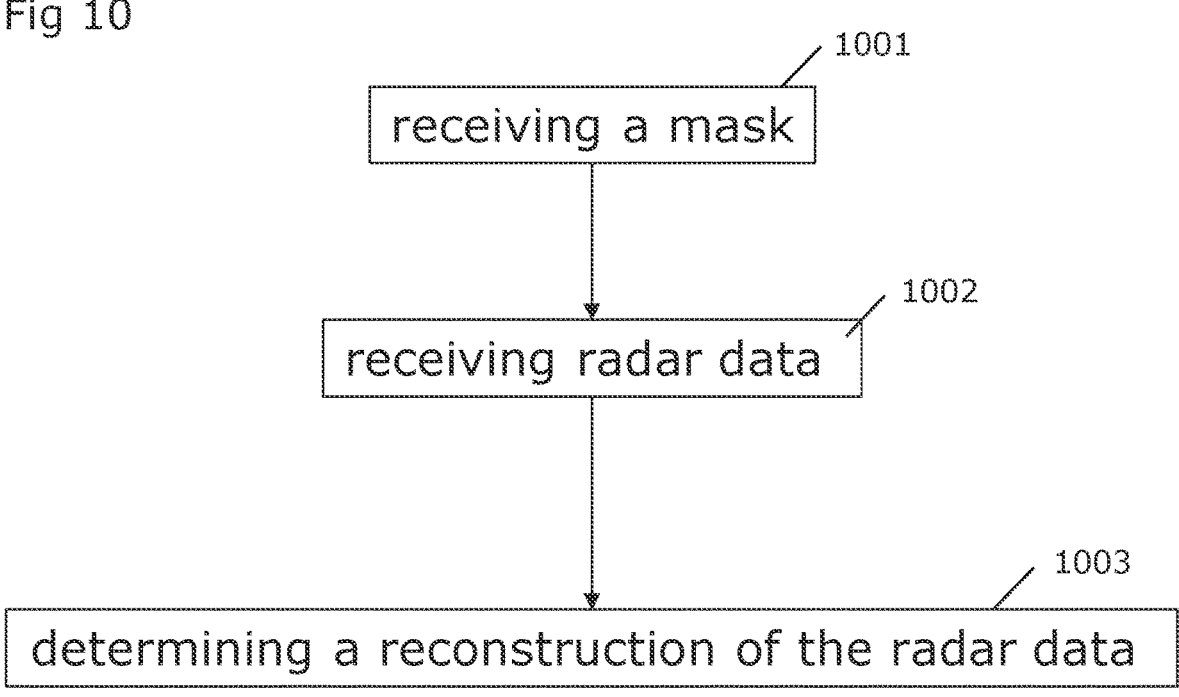
FIG. 10 illustrates an example embodiment of a method of processing radar data.

To summarize the disclosure thus far we refer to FIG. 4 (showing an example apparatus) and FIG. 10 (showing an example method). Thus, to summarize, in one or more embodiments, the method, which may be performed by the processor 400 comprises receiving a mask 1001, receiving radar data 1002 and determining a reconstruction of the radar data 1003.

The mask identifies a set of samples in received radar signalling that are detected as interference. The received radar signalling comprises that which has transmitted and reflect from one or more objects. The received radar signalling may be of a plurality of chirps or pulses such that the mask comprises a matrix of data having a fast-time dimension and a slow-time dimension, as will be understood by those skilled in the art of radar signal processing.

In one or more examples, the radar data comprises a matrix of samples of received radar signalling having a fast-time dimension and a slow-time dimension corresponding to that of the mask. In the present example, the radar data has been interference mitigated wherein the set of samples identified by the mask have been set to a predetermined value (typically zero) to remove said samples including interference.

Thus, the determining of the reconstruction of the radar data uses an iterative method to solve an optimization problem. Thus, in one or more examples, at least the set of samples of the radar data that were zeroed are replaced with estimated samples. In some examples, only those samples that were identified by the mask are estimated. In other examples, those samples that were identified by the mask and non-zeroed samples are estimated by the present method.

The determination of a reconstruction of the radar data may comprise formulating an optimization problem based on the two-dimensional radar data and the two-dimensional mask (e.g. see at least equations 5 and 6). The method further comprises applying an iterative method to solve the optimization problem at least in part in the range-Doppler domain wherein an output of each iteration of the iterative method is converted to the time domain and wherein reconstruction of the radar data comprises said output after at least one iteration. Thus, in one or more examples the applying of the iterative method to solve the optimization problem comprises the solving of equation 5 or equation 6 over at least one iteration.

It has been found that the determination of the reconstruction of the radar data using a method that is able to operate on the two-dimensional radar data and two-dimensional mask (i.e. fast-time vs slow-time) in the range-Doppler domain can, in one or more examples, be advantageous. It may be the use of two-dimensional radar data and two-dimensional mask with the reconstruction being performed in the range-Doppler domain, i.e. the sparse domain, that results in effective application of the iterative method.

Thus, the optimization problem solved by the iterative method may be a function of the radar data received by the apparatus 400 at step 1001 having been range-Doppler processed. Range-Doppler processing may be achieved by application of a two-dimensional Fourier Transform to said radar signalling. In some examples, x, may be sufficiently sparse without range-Doppler processing but in the examples that follow, the processing is based on the range-Doppler processed radar data, $F\{y\}$.

In one or more examples, a first iteration of said iterative method is configured to apply a soft thresholding function $T_\lambda(.)$ to a function of the range-Doppler processed radar data y wherein, for the first iteration, $x_k=x_0$ (see equation 5 or 6) wherein $x_0$ comprises a zero-valued matrix. It will be appreciated that in other examples different initialisations for $x_0$ may be defined that result in a faster convergence of the estimate. For a subsequent iteration of said iterative method, after the first iteration, the method may comprise applying a soft thresholding function to a function of the output of a previous iteration, the mask and the radar data.

Thus, to summarize equation 6, the iterative method comprises determining an output $x_{k+1}$ of the subsequent iteration by the steps of:

determining a first function, $(m \odot x_k-y)$, comprising the difference between an element-wise multiplication of the mask and an output of an iteration comprising an immediately prior iteration, and the radar data y (also known as the residual);

determining a section function, $\mu(m \odot x_k-y)$, comprising a scalar multiplied by the first function, wherein the scalar is a step-size, which is loosely analogous to a step-size of the ISTA algorithm;

determining a third function, $x_k-\mu(m \odot x_k-y)$, comprising the output of the iteration that comprises the immediately prior iteration minus the second function; and determining a fourth function, $T_\lambda(F\{x_k-\mu(m \odot x_k-y)\})$, comprising the application of a complex soft thresholding function to a two-dimensional Fourier Transform of the third function; and determining an inverse two-dimensional Fourier Transform (see equation 6) of said fourth function.

The step-size scalar $\mu$ determines the rate at which the "residual" $(m \odot x_k-y)$ is subtracted from the previous estimate $x_k$. Further, it also determines if the non-zeroed samples remain unaffected. Choosing a step-size scalar unequal to one causes the non-zeroed time domain samples to be altered in the iterations, resulting in a denoising effect. This may be desired.

Then if we fix the step-size scalar $\mu=1$, then we can rewrite equation (6) as:

$$x_{k+1} = F^{-1}\{T_\lambda(F\{(1-m)\odot x_k + y\})\} \qquad (7)$$

which means that we only update the missing samples and keep all original non-interfered samples untouched. This can be a prerequisite if the radar detections are found using a (Constant False Alarm Rate) CFAR detector, as setting $\mu=1$ will keep the noise statistics equal on the original samples. CFAR detectors are typically square law detectors that require additive white Gaussian noise on top of the to-be-detected signal. Thus, equation 7 represents a third embodiment of the formulation of the optimization problem and iterative method.

In a further embodiment, another approach is to have a $\mu \neq 1$ during the iterations, but restrict only the missing samples to be updated in the very end (after K iterations), using:

$$\hat{x} = m \odot x + (1-m) \odot x_k \qquad (8)$$

Wherein the reconstruction of the radar data is designated $\hat{x}$ and wherein m designates the mask, $m \odot x$ designates the radar data and $x_k$ designates the output of at least one iteration. Thus, equations 5 or 6 in combination with equation 8 represents a further embodiment of the iterative method.

In case one desires to use a detector other than CFAR, a different $\mu$ may be provided for each iteration and (using deep learning) one can learn the optimal update step $\mu_k$ for the kth iteration. Now, after convergence, the result will be sparse in the range-Doppler output, meaning that target signals will be non-zero while the other bins are (very close to) zero. This can be seen as a denoising step.

Figures 6, 7:
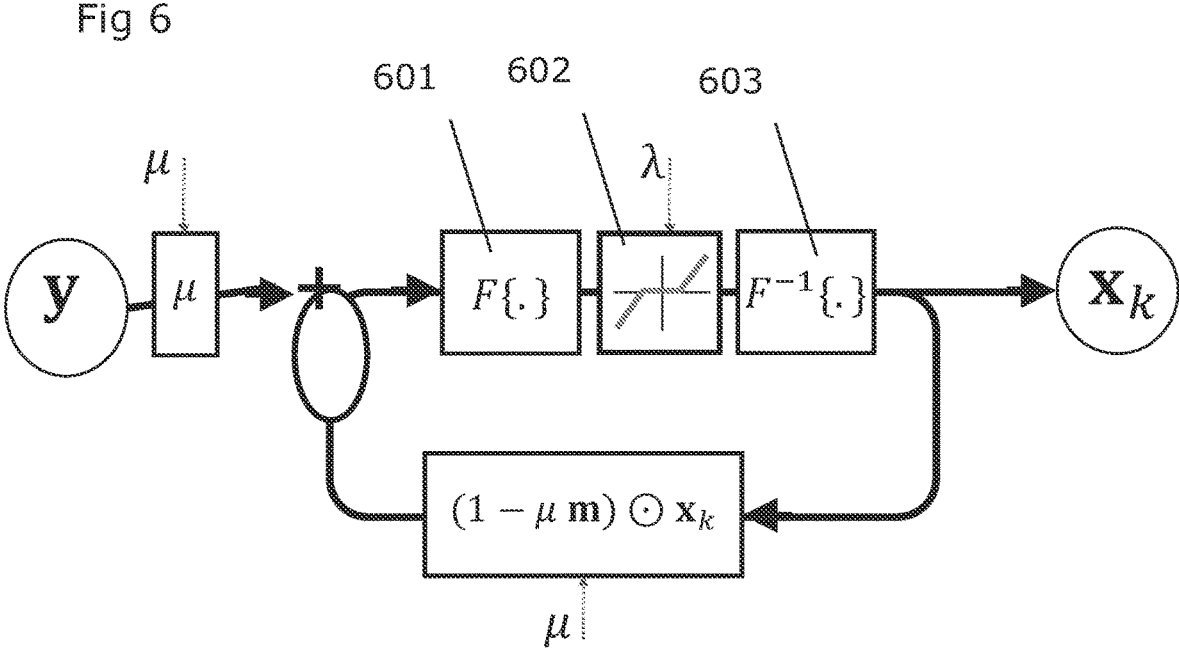
FIG. 6 shows a first example block diagram of an iterative method as applied for reconstruction of radar data.
FIG. 7 shows a second example block diagram of an iterative method as applied for reconstruction of radar data.

The block diagram of the iterative method, applied to two-dimensional time-domain signal reconstruction with a known subsampling mask m, has been depicted in FIG. 6. Thus, for a first iteration of said iterative method the steps comprise: determining 601 a two-dimensional Fourier Transform of the radar data; applying 602 a soft thresholding function to the two-dimensional Fourier Transform of the radar data to determine a thresholded dataset; and determining 603 an output of the first iteration by determining an Inverse two-dimensional Fourier Transform of the thresholded dataset.

Analytic Learned ISTA

In a further example, an embodiment of the method may comprise the application of Analytic Learned ISTA (AL-ISTA), which comprises a variation of ISTA.

For each kth layer in ALISTA, the step size parameter $\mu_k$ and shrinkage threshold $\lambda_k$ are learned through back-propagation, yielding the following equation:

$$x_{k+1} = F^{-1}\{T_{\lambda_k}(F\{x_k - \mu_k(m \odot x_k - y)\})\} \qquad (9)$$

This equation may be considered similar to Equation (5), but the difference is the use of an optimized $\mu_k$ and $\lambda_k$ for a kth-layer, which may lead to faster convergence and more optimized thresholding, respectively. Thus, the iterative method may comprise the use of a different threshold of the thresholding function for each iteration and the use of a difference scalar (step-size) for each iteration.

Thus, in the present "ALISTA" inspired method, the above described iterative method is performed based on a step-size scalar $\mu_k$ which defines an update coefficient and a shrinkage-threshold $\lambda_k$ which defines a threshold of the complex soft thresholding function and wherein said method comprises, for each iteration, determining an updated step-size scalar $\mu_k$ and an updated shrinkage-threshold $\lambda_k$ for use in a subsequent iteration.

In one or more examples, and as mentioned previously, the shrinkage-threshold $\lambda_k$ provides a means that sets signals with an absolute value smaller than $\lambda_k$ to zero and shrinks signals that have an absolute value larger than $\lambda_k$ to a smaller absolute value without distorting the phase of the complex signal.

Analytic Learned Fast-ISTA

In a further example, an embodiment of the method may comprise the application of Fast ISTA or "FISTA". Conventional FISTA is known to preserve the computational simplicity of ISTA, while the rate of convergence may be significantly better due to the additional "momentum term" (Equation (12) below). A method similar to FISTA can be applied to the present missing data radar problem. Like in ALISTA there are iteration parameters $\lambda_k$ and $\mu_k$ which as in the previous embodiment may be determined using Deep Learning.

We propose a novel model-based algorithm, called Analytic Learned Fast-ISTA (ALFISTA), where the unfolded steps for K-layer ALFISTA with learned $\mu_k$ and $\lambda_k$. In particular, it may be advantageous that the parameters $\mu_k$ and $\lambda_k$ are learned.

Thus, in one or more examples, we define the ALFISTA method as:

$$x_k = F^{-1}\{T_{\lambda_k}(F\{s_k - \mu_k(m \odot s_k - y)\})\} \qquad (10)$$

$$t_{k+1} = \frac{1 + \sqrt{1 + 4t_k^2}}{2} \qquad (11)$$

$$s_{k+1} = x_k + \frac{t_k - 1}{t_{k+1}}(x_k - x_{k-1}) \qquad (12)$$

Figure 8:
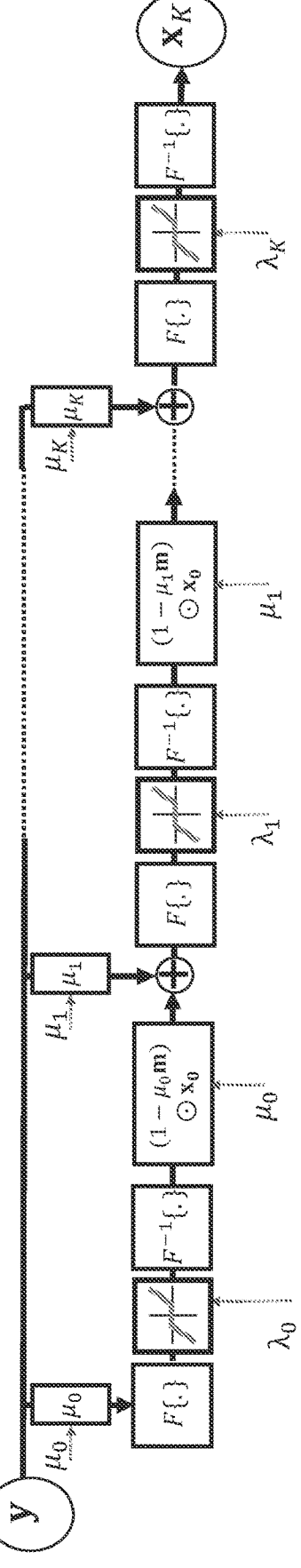
FIG. 8 shows a third example block diagram of an iterative method as applied for reconstruction of radar data.
Figure 9:
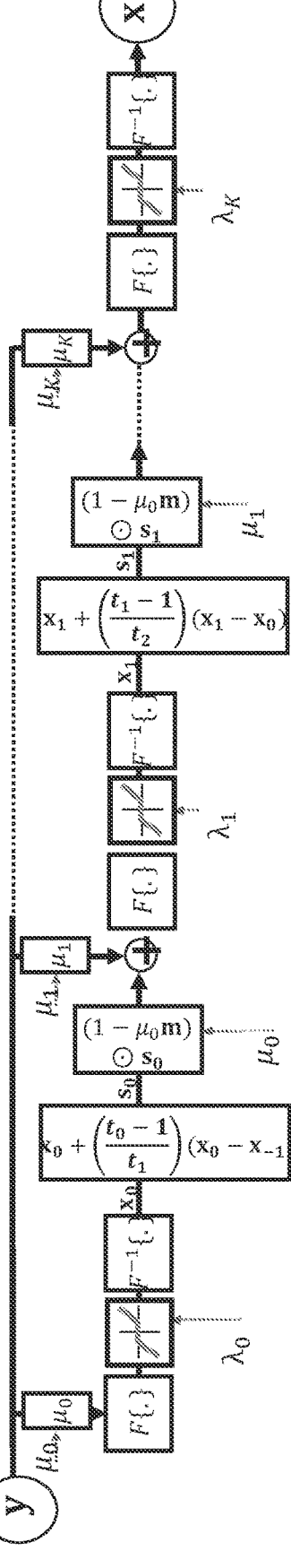
FIG. 9 shows a fourth example block diagram of an iterative method as applied for reconstruction of radar data.

FIG. 7 shows the block diagrams for FISTA and FIG. 8 and FIG. 9 show the proposed unfolded ALISTA and ALFISTA algorithms.

In one or more examples, the above-mentioned processing steps may be implemented iteratively. Thus, the processing steps may be defined by software executed by a processor. In other examples, the processing steps may not be implemented iteratively and instead may be performed in hardware. Thus, in other implementations, the processing steps may be implemented by a chain of hardware components configured to perform the processing steps a predetermined number of times.

Test Results

As all artefacts, caused by the signal gaps due to zeroing, propagate from the time-domain signal to the range-Doppler spectra, we are interested in the performance in the range-Doppler output. We simulate L targets randomly for different range, velocity and RCS values, where L is varied for training and evaluating the neural networks. Given the number of zeroes $N_0$ present in ADC samples of a single measurement, we can calculate the corrupted/zeroing ratio $r = N_0/(NM) \cdot 100\%$.

One can observe that the reconstruction improves for increasing K, while ALFISTA shows better reconstruction performance for smaller K compared to ALISTA, especially when K>2. The increased convergence rate of ALFISTA is especially visible for larger r. For r=70%, we have shown that the target peak power for a target at R=85.9 m improves with almost 15 dB for ALFISTA with K=20. We have investigated the performance of the abovementioned methods on the detection performance, which was explored using a one-dimensional Ordered Statistic (OS-)CFAR to calculate precision and recall:

$$\text{precision} = \frac{TP}{TP + FP}, \text{recall} = \frac{TP}{TP + FN}$$

where TP is the number of true positives, FP is the number of false positives and FN is the number of false negatives.

When applying our iterative method using learned step size and thresholding function thresholds, we are able to restore the target peak power and velocity PSR, which consequently leads to increased performance in precision and recall. It was noted by the inventors that, even for r=80%, i.e. 80% of all time-domain input ADC samples are zeroed, a recall of 0.993 is reached using ALFISTA with K=20, compared to the ground truth of 0.999 and zeroing of 0.883.

Computational Complexity

As mentioned before, ISTA requires many iterations to converge (approx. 500-1000). ALISTA is able to reduce the number of iterations compared to ISTA with a factor ten to approx. 50-100. Consequently, ALFISTA may, in one or more examples, be the most optimal of the presented method and converges with only 5-20 iterations.

Obviously, the number of iterations that lead to optimal reduction of the artefacts, depends on the percentage of corrupted samples. The more samples are corrupted, the longer it takes to reconstruct the time-domain signals. Hence, in one or more examples, the hyperparameters K, $\mu$ and $\lambda$ can be trained and optimized for various r and likewise stored in a lookup table. Then, depending on the corrupted ratio r that was experienced in a single FMCW measurement, the hyperparameters can be accessed in the look-up table to increase the convergence and reduce the computational burden.

The functionality that is described herein is not limited to the use of binary masks; also masks that make a gradual transition from non-interfered samples to interfered samples, and a gradual transition from interfered samples to non-interfered samples, can be used. Also, the implementation of the LASSO and ISTA method may vary between implementations. The disclosure gives examples of the use of LASSO and ISTA for the purpose of illustrating the two-dimensional processing of the radar data and mask, which may provide for more effective reconstruction of the radar data.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs or Digital Signal Processors). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A method of processing radar data, the method comprising:

receiving a mask that identifies a set of samples in received radar signalling that are detected as including interference, wherein the mask comprises a matrix of data having a fast-time dimension and a slow-time dimension;

receiving radar data comprising a matrix of samples of received radar signalling having a fast-time dimension and a slow-time dimension wherein the set of samples identified by the mask have been set to a predetermined value to remove said samples including interference; and determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain wherein an output of each iteration of the iterative method is converted to the time domain and wherein reconstruction of the radar data comprises said output after at least one iteration, wherein a first iteration of said application of the iterative method to solve the optimization problem includes determining a two-dimensional Fourier Transform of the radar data multiplied by a predetermined scalar, μ, wherein the two-dimensional Fourier Transform provides for conversion to the range-Doppler domain, applying a soft thresholding function to the two-dimensional Fourier Transform of the radar data multiplied by the predetermined scalar, to determine a thresholded dataset, and determining an output of the first iteration by determining an Inverse two-dimensional Fourier Transform of the thresholded dataset to provide for the conversion to the time domain, and each subsequent iteration of said iterative method includes determining an output of the subsequent iteration by the steps of determining a first function comprising the difference between an element-wise multiplication of the mask and an output of an iteration comprising an immediately prior iteration, and the radar data, determining a second function comprising a scalar multiplied by the first function, wherein the scalar is termed a step-size scalar, determining a third function comprising the output of the iteration that comprises the immediately prior iteration minus the second function, determining a fourth function comprising the application of a complex soft thresholding function to a two-dimensional Fourier Transform of the third function, and determining an inverse two-dimensional Fourier Transform of said fourth function.

2. The method of claim 1, wherein the iterative method includes application of a thresholding function in the range-Doppler domain.

3. The method of claim 1, wherein the first iteration of said iterative method is configured to apply the soft thresholding function to a function of the range-Doppler processed radar data.

4. The method of claim 3, wherein the determination of the reconstruction of the radar data comprises a plurality of iterations of the iterative method; and wherein the subsequent iteration of said iterative method, after the first iteration, is configured to apply the soft thresholding function to a function of the output of a previous iteration, the mask and the radar data.

5. The method of claim 1, wherein said complex soft thresholding function comprises $T_\lambda(x)=e^{j\angle^x}(|x|-\lambda)_+$ wherein x represents the data to which the complex soft thresholding function is applied and λ represents the threshold of the thresholding function, wherein values of x that have $|x|<\lambda$ will be set to zero and the other values will be scaled to $|x|-\lambda$.

6. The method of claim 1, wherein the step-size scalar comprises one.

7. The method of claim 1, wherein said iterative method is performed based on the step-size scalar $\mu_k$ which defines a step-size for each iteration of the iterative method and a shrinkage-threshold $\lambda_k$ which defines a threshold of the complex soft thresholding function applied in each iteration and wherein said method includes using an updated step-size scalar $\mu_k$ and updated shrinkage-threshold $\lambda_k$ in the subsequent iteration.

8. The method of claim 7, wherein the updated step-size scalar $\mu_k$ and the updated shrinkage-threshold $\lambda_k$ for use in the subsequent iteration or iterations is determined using a deep learning process involving back-propagation.

9. A method of processing radar data, the method comprising:

receiving a mask that identifies a set of samples in received radar signalling that are detected as including interference, wherein the mask comprises a matrix of data having a fast-time dimension and a slow-time dimension;

receiving radar data comprising a matrix of samples of received radar signalling having a fast-time dimension and a slow-time dimension, wherein the set of samples identified by the mask have been set to a predetermined value to remove said samples including interference; and determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain, an output of each iteration of the iterative method is converted to the time domain, reconstruction of the radar data comprises said output after at least one iteration, a first iteration of said application of the iterative method to solve the optimization problem includes determining a two-dimensional Fourier Transform of the radar data multiplied by a predetermined scalar, μ, wherein the two-dimensional Fourier Transform provides for conversion to the range-Doppler domain, applying a soft thresholding function to the two-dimensional Fourier Transform of the radar data multiplied by the predetermined scalar, to determine a thresholded dataset, and determining an output of the first iteration by determining an Inverse two-dimensional Fourier Transform of the thresholded dataset to provide for the conversion to the time domain, and each subsequent iteration of said iterative method comprises determining an output of the subsequent iteration by the steps of determining a first function comprising the element-wise multiplication of a function of the mask and an output of an iteration comprising an immediately prior iteration, wherein the function of the mask comprises (1−μm) wherein μ comprises a predetermined scalar termed a step-size scalar, determining a second function comprising the first function added to the radar data scaled by said step-size scalar, determining a third function comprising the application of a complex soft thresholding function to a two-dimensional Fourier Transform of the second function, and determining an inverse two-dimensional Fourier Transform of said third function.

10. A method of processing radar data, the method comprising:

receiving a mask that identifies a set of samples in received radar signalling that are detected as including interference, wherein the mask comprises a matrix of data having a fast-time dimension and a slow-time dimension;

receiving radar data comprising a matrix of samples of received radar signalling having a fast-time dimension and a slow-time dimension wherein the set of samples identified by the mask have been set to a predetermined value to remove said samples including interference; and determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain wherein an output of each iteration of the iterative method is converted to the time domain and wherein reconstruction of the radar data comprises said output after at least one iteration, and wherein an output of an iteration of said iterative method is defined by $x_k$ wherein:

$$x_k = F^{-1}\{T_{\lambda_k}(F\{s_k - \mu_k(m \odot s_k - y)\})\}$$

wherein F{ } and $F^{-1}${ } represent a two-dimensional Fourier transform and inverse two-dimensional Fourier transform respectively, $T_{\lambda_k}$ represents a complex soft thresholding function with threshold $\lambda_k$, m represents said mask; y represents said radar data and $\mu_k$ represents an step-size scalar and $\odot$ represents an element-wise multiplication; and wherein:

$$t_{k+1} = \frac{1 + \sqrt{1 + 4t_k^2}}{2} \text{ and}$$

$$s_{k+1} = x_k + \frac{t_{k-1}}{t_{k+1}}(x_k - x_{k-1}).$$

11. A method of processing radar data, the method comprising:

receiving a mask that identifies a set of samples in received radar signalling that are detected as including interference, wherein the mask comprises a matrix of data having a fast-time dimension and a slow-time dimension;

receiving radar data comprising a matrix of samples of received radar signalling having a fast-time dimension and a slow-time dimension wherein the set of samples identified by the mask have been set to a predetermined value to remove said samples including interference; and determining a reconstruction of the radar data in which at least the set of samples of the radar data are replaced with estimated samples, wherein said determining a reconstruction of the radar data comprises formulating an optimization problem based on the radar data and the mask, and applying an iterative method to solve the optimization problem at least in part in the range-Doppler domain wherein an output of each iteration of the iterative method is converted to the time domain and wherein reconstruction of the radar data comprises said output after at least one iteration, and wherein only said set of samples are replaced with estimated samples such that said reconstruction of the radar data is designated $\hat{x}$ wherein $$\hat{x} = m \odot x + (1-m) \odot x_x$$

wherein m designates the mask, x designated the radar data and $x_k$ designates the output of at least one iteration of said iterative method.

12. A processor configured to:

receive a mask that identifies a set of samples in received radar signalling that are detected as including interference, wherein the mask comprises a matrix of data having a fast-time dimension and a slow-time dimension;

receive radar data comprising a matrix of samples of received radar signalling having a fast-time dimension and a slow-time dimension wherein the set of samples identified by the mask have been set to a predetermined value to remove said samples including interference; and determine a reconstruction of the radar data in which at least the set of samples of the radar data are replaced with estimated samples, wherein said determination of a reconstruction of the radar data comprises formulating an optimization problem based on the radar data and the mask, and applying an iterative method to solve the optimization problem at least in part in the range-Doppler domain, wherein an output of each iteration of the iterative method is converted to the time domain, reconstruction of the radar data comprises said output based on at least one iteration, a first iteration of said application of the iterative method to solve the optimization problem includes determining a two-dimensional Fourier Transform of the radar data multiplied by a predetermined scalar, $\mu$, wherein the two-dimensional Fourier Transform provides for conversion to the range-Doppler domain, applying a soft thresholding function to the two-dimensional Fourier Transform of the radar data multiplied by the predetermined scalar, to determine a thresholded dataset, and determining an output of the first iteration by determining an Inverse two-dimensional Fourier Transform of the thresholded dataset to provide for the conversion to the time domain, and each subsequent iteration of said iterative method includes determining an output of the subsequent iteration by determining a first function comprising a difference between an element-wise multiplication of the mask and an output of an iteration comprising an immediately prior iteration, and the radar data, determining a second function comprising a scalar multiplied by the first function, wherein the scalar is termed a step-size scalar, determining a third function comprising the output of the iteration that comprises the immediately prior iteration minus the second function, determining a fourth function comprising the application of a complex soft thresholding function to a two-dimensional Fourier Transform of the third function, and determining an inverse two-dimensional Fourier Transform of said fourth function.

13. The processor of claim 12, wherein the iterative method includes application of a thresholding function in the range-Doppler domain.

14. The processor of claim 12, wherein the first iteration of said iterative method is configured to apply the soft thresholding function to a function of the range-Doppler processed radar data.

15. The processor of claim 12, wherein the determination of the reconstruction of the radar data comprises a plurality of iterations of the iterative method; and wherein the subsequent iteration of said iterative method, after the first iteration, is configured to apply the soft thresholding function to a function of the output of a previous iteration, the mask and the radar data.

* * * * *